United States Patent
Sakaguchi et al.

(10) Patent No.: US 10,573,902 B2
(45) Date of Patent: Feb. 25, 2020

(54) OXYGEN REDUCTION CATALYST, ELECTRODE, MEMBRANE ELECTRODE ASSEMBLY, AND FUEL CELL

(71) Applicant: SHOWA DENKO K.K., Tokyo (JP)

(72) Inventors: Suguru Sakaguchi, Tokyo (JP); Yoshishige Okuno, Tokyo (JP); Takuya Imai, Tokyo (JP); Kunchan Lee, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 16/471,623

(22) PCT Filed: Dec. 27, 2017

(86) PCT No.: PCT/JP2017/046947
§ 371 (c)(1),
(2) Date: Jun. 20, 2019

(87) PCT Pub. No.: WO2018/124194
PCT Pub. Date: Jul. 5, 2018

(65) Prior Publication Data
US 2019/0386321 A1  Dec. 19, 2019

(30) Foreign Application Priority Data
Dec. 27, 2016 (JP) .................. 2016-253407

(51) Int. Cl.
*B01J 27/04* (2006.01)
*B01J 27/045* (2006.01)
(Continued)

(52) U.S. Cl.
CPC ........... *H01M 4/926* (2013.01); *B01J 27/043* (2013.01); *B01J 27/0515* (2013.01); *H01M 4/923* (2013.01); *H01M 8/10* (2013.01)

(58) Field of Classification Search
CPC ........ B01J 27/04; B01J 27/045; B01J 27/047; B01J 27/051; H01M 4/923; H01M 8/10
(Continued)

(56) References Cited

U.S. PATENT DOCUMENTS 3,600,313 A * 8/1971 Donohue ............... H01F 1/40
252/62.51 R
5,010,049 A * 4/1991 Villa-Garcia .......... B01J 27/051
502/182
(Continued)

FOREIGN PATENT DOCUMENTS

CN 103962157 A 8/2014
CN 10-5304872 * 2/2016 ............ B82Y 30/00
(Continued)

OTHER PUBLICATIONS

English translation of PCT/JP2017/046947 Written Opinion. (Year: 2017).*
(Continued)

*Primary Examiner* — Patricia L. Hailey
(74) *Attorney, Agent, or Firm* — Sughrue Mion, PLLC

(57) ABSTRACT

The present invention relates to an oxygen reduction catalyst, an electrode, a membrane electrode assembly, and a fuel cell, and the oxygen reduction catalyst is an oxygen reduction catalyst containing substituted $CoS_2$, in which the substituted $CoS_2$ has a cubic crystal structure, the oxygen reduction catalyst contains the substituted $CoS_2$ within 0.83 nm from the surface thereof, and the substituted $CoS_2$ has at least one substitutional atom selected from the group consisting of Cr, Mo, Mn, Tc, Re, Rh, Cu, and Ag in some of Co atom sites.

5 Claims, 3 Drawing Sheets

(51) Int. Cl.
  *B01J 27/047* (2006.01)
  *B01J 27/051* (2006.01)
  *H01M 4/92* (2006.01)
  *H01M 8/10* (2016.01)
  *B01J 27/043* (2006.01)

(58) Field of Classification Search
  USPC .................. 502/220, 222, 219, 223; 429/400
  See application file for complete search history.

(56) References Cited

U.S. PATENT DOCUMENTS

| | | | | |
|---|---|---|---|---|
| 9,647,154 B2* | 5/2017 | Miszta | .................. | B82Y 40/00 |
| 2011/0105311 A1 | 5/2011 | Ueno et al. | | |
| 2011/0111322 A1 | 5/2011 | Ueno | | |

FOREIGN PATENT DOCUMENTS

| | | | | |
|---|---|---|---|---|
| CN | 10-8511750 | * | 9/2018 | .............. H01M 4/58 |
| CN | 10-9411239 | * | 3/2019 | .............. B82Y 40/00 |
| JP | 2005-317288 A | | 11/2005 | |
| JP | 2009-43618 A | | 2/2009 | |
| JP | 2009-43620 A | | 2/2009 | |

OTHER PUBLICATIONS

Yan Cui et al., "Highly active and stable electrocatalytic hydrogen evolution catalyzed by nickel, iron doped cobalt disulfide@ reduced graphene oxide nanohybrid electrocatalysts." Materials Energy Today Energy 7, pp. 44-50. (Year: 2017).*

Haichuan Zhang et al., "Highly Crystallized Cubic Cattierite CoS2 for Electrochemically Hydrogen Evolution over Wide pH Range from 0 to 14." Electrochimica Acta 148, pp. 170-174. (Year: 2014).*

Shuo Yao et al., "Cobalt sulfides as efficient catalyst towards oxygen reduction reactions." Chinese Chemical Letters, pp. 1-5. (Year: 2019).*

Tomiya Kishi et al., "Effect of Substitution of Metal Atoms in Nickel Sulphides and Cobalt Sulphides on Their Anodic Behaviours." Surface Technology 20, pp. 157-166. (Year: 1983).*

Liu et al., Facile one-pot synthesis of $CoS_2$-$MoS_2$/CNT's as efficient electrocatalyst for hydrogen evolution reaction; Applied Surface Science, May 4, 2016, vol. 384, pp. 51-57.

Stephens et al., "Understanding the electrocatalysis of oxygen reduction on platinum and its alloys", Energy Environ. Sci., 2012, 5, 6744-6762.

Escano et al., First-principle study on surface structure, thickness and composition dependence of the stability of Pt-skin/$Pt_3$Co oxygen-reduction-reaction catalysts, Journal of Power Sources, 2014, 247, 562-571.

Zhang et al., "Controlling the Catalytic Activity of Platinum Monolayer Electrocatalysts for Oxygen Reduction with Different Substrates", Angew. Chem. Int. Ed., 2005, 44, 2132-2135.

Office Action dated Jul. 31, 2018 by the Japan Patent Office in Japanese Patent Application No. 2018-525795, 5 pages total including translation.

International Search Report for International Application No. PCT/JP2017/046947 dated Mar. 27, 2019, 5 pages total including translation.

* cited by examiner

[Figure 1(a)]
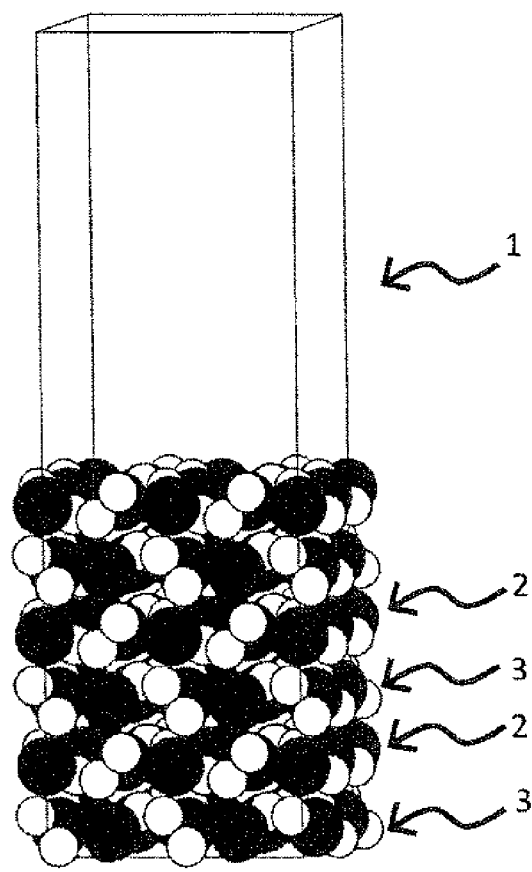
[Figure 1(b)]
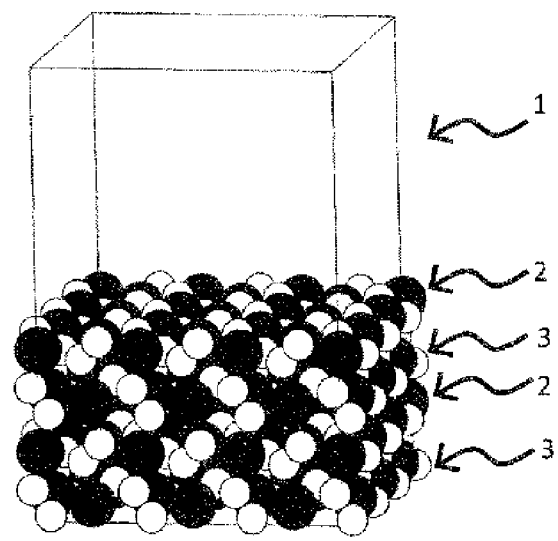

[Figure 2(a)]
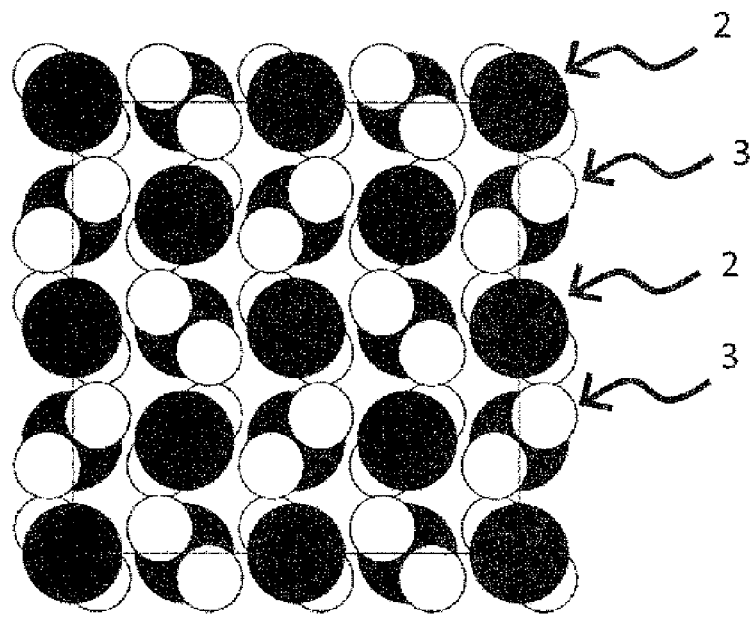
[Figure 2(b)]
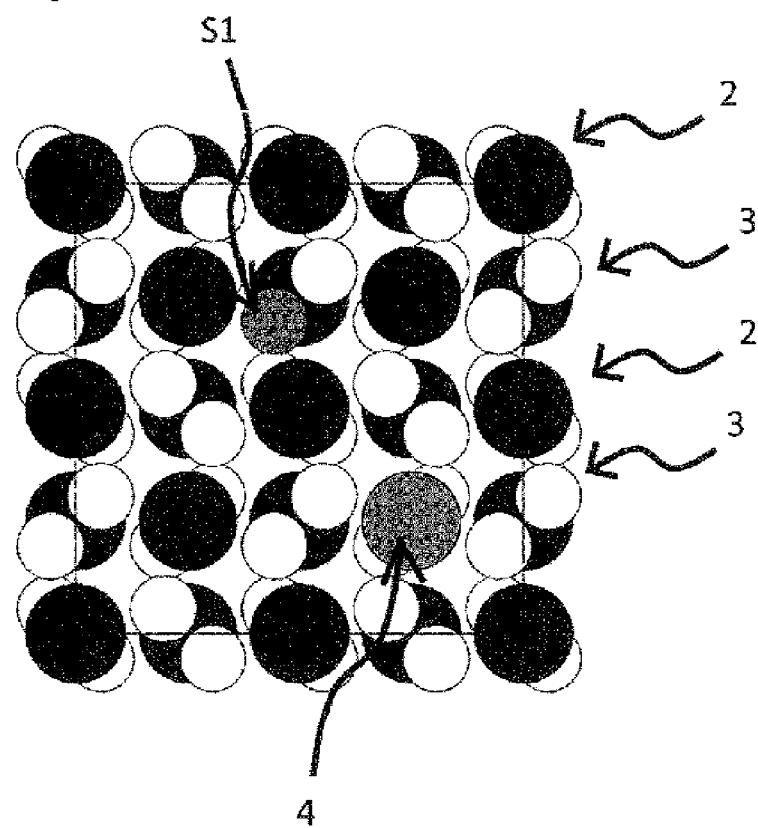

[Figure 3]
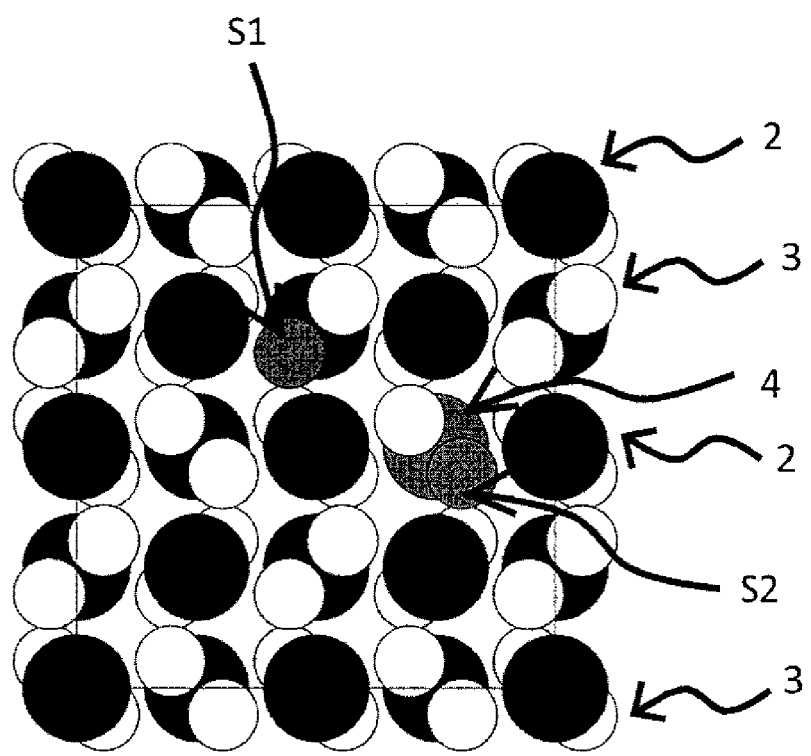

OXYGEN REDUCTION CATALYST, ELECTRODE, MEMBRANE ELECTRODE ASSEMBLY, AND FUEL CELL

CROSS REFERENCE TO RELATED APPLICATIONS

This application is a National Stage of International Application No. PCT/JP2017/046947, filed Dec. 27, 2017, claiming priority to Japanese Patent Application No. 2016-253407, filed Dec. 27, 2016.

TECHNICAL FIELD

The present invention relates to an oxygen reduction catalyst, an electrode, a membrane electrode assembly, and a fuel cell.

BACKGROUND ART

A catalyst is used in an electric cell such as a polymer electrolyte fuel cell (PEFC), and specifically, a cathode or an anode having a layer containing a catalyst are used in order to enhance the reaction rate of a PEFC and enhance the energy conversion efficiency of a PEFC.

As this catalyst, a noble metal catalyst is generally used, and platinum, which is highly active among the noble metals, is mainly used. However, platinum is expensive, and therefore utilization of PEFCs is limited in terms of, for example, costs.

In addition, the cathode of a PEFC is in an oxidizing and strongly acidic atmosphere and has high electric potential, and therefore materials which are stable in a PEFC operating environment are extremely limited. It is known that even platinum, which is particularly stable among the noble metals, undergoes oxidation and dissolution due to long-term usage and the activity is deteriorated.

A large amount of a noble metal catalyst is used in a cathode in order to solve this problem and also from the viewpoint of keeping the power generation performance of a PEFC; however, such use of a large amount of the noble metal catalyst is a big problem in terms of both costs and resources.

A non-platinum catalyst having high catalytic activity and having high durability in an PEFC operating environment have been desired in order to solve the above-described problem, specifically, from the viewpoints such as reducing the costs and expanding the use of a PEFC.

A metal sulfide as a non-platinum catalyst has a small band gap, exhibits electrical conductivity comparable to a metal, and therefore is used as a photocatalyst or an electrode catalyst for oxidation-reduction reaction.

For example, it is described in Patent Literature 1 that a RuMoS/C catalyst can exhibit properties as a catalyst because a sulfur component is harder to eliminate in the RuMoS/C catalyst than in RuS/C. However, Ru is the main component of metal components in the RuMoS/C catalyst and therefore is not preferable in terms of costs. In addition, it is not described that $CoS_2$ having a cubic crystal structure is substituted with a substitutional atom to improve the durability.

Searches for a material from computational chemistry approaches have been recently conducted from the viewpoints such as making experiments efficient accompanying drastic improvements in the computer performance (for example, Non Patent Literatures 1 to 3).

CITATION LIST

Patent Literature

Patent Literature 1: Japanese Patent Laid-Open No. 2009-43618

Non Patent Literature

Non Patent Literature 1: Ifan E. L. Stephens et al., "Understanding the electrocatalysis of oxygen reduction on platinum and its alloys", Energy Environ. Sci., 2012, 5, 6744-6762.

Non Patent Literature 2: M. C. S. Escano et al., "First-principle study on surface structure, thickness and composition dependence of the stability of Pt-skin/Pt3Co oxygen-reduction-reaction catalysts" Journal of Power Sources, 2014, 247 562-571.

Non Patent Literature 3: J. Zhang et al., "Controlling the Catalytic Activity of Platinum Monolayer Electrocatylysts for Oxygen Reduction with Different Substrates", Angew. Chem. Int. Ed., 2005, 44, 2132-2135.

SUMMARY OF INVENTION

Technical Problem

One embodiment of the present invention provides, based on a computational chemistry approach, an oxygen reduction catalyst containing substituted $CoS_2$ having superior durability to conventional $CoS_2$.

Solution to Problem

The present inventors have conducted diligent studies in order to solve the above-described problem to find that the problem can be solved according to the following constitution examples and completed the present invention.

The constitution examples of the present invention are as follows.

[1] An oxygen reduction catalyst containing substituted $CoS_2$, wherein the substituted $CoS_2$ has a cubic crystal structure; the oxygen reduction catalyst contains the substituted $CoS_2$ within 0.83 nm from the surface of the oxygen reduction catalyst; and the substituted $CoS_2$ has at least one substitutional atom selected from the group consisting of Cr, Mo, Mn, Tc, Re, Rh, Cu, and Ag in some of Co atom sites.

[2] The oxygen reduction catalyst according to [1], wherein a proportion of a number of substitutional atoms in the substituted $CoS_2$, the proportion calculated by the following equation, is 5 to 15%:

Proportion [%] of number of substitutional atoms=
[number of substitutional atoms]/[number of substitutional atoms+number of Co atoms]×100.

[3] An electrode having a catalyst layer containing the oxygen reduction catalyst according to [1] or [2].

[4] A membrane electrode assembly comprising: a cathode; a polymer electrolyte membrane; and an anode, in this order, wherein the cathode is the electrode according to [3].

[5] A fuel cell including the membrane electrode assembly according to [4].

Advantageous Effects of Invention

According to one embodiment of the present invention, an oxygen reduction catalyst containing substituted $CoS_2$ having superior durability to conventional $CoS_2$ can be obtained based on a computational chemistry approach, and particularly, an oxygen reduction catalyst containing substituted $CoS_2$ exhibiting excellent durability in, for example, a fuel cell environment can be obtained.

BRIEF DESCRIPTION OF DRAWINGS

FIGS. 1(a) and 1(b) are schematic diagrams of standard unit cells which are utilized for calculating ΔE, which will be described below, when a proportion of a substitutional atom (proportion of number of substitutional atoms) existing in $CoS_2$ having a cubic crystal structure is 12.5% and is 5.6% respectively. $CoS_2$ having a cubic crystal structure in these Figures is not substituted and is constituted only by a cobalt atoms (each represented by black circle) and sulfur atoms (each represented by white circle). Frame lines of the quadrangular prism constitute the space of a unit cell, and atoms are packed inside the unit cell approximately to the center in a thickness direction (vertical direction in Figure). An upper face of the packed atoms in Figure is a surface of $CoS_2$ having a cubic crystal structure. FIG. 1(a) illustrates $CoS_2$ the surface (upper face of packed atoms inside unit cell) of which is a [100] plane having a size of 2×2, the $CoS_2$ having 6 layers in the thickness direction. FIG. 1(b) illustrates $CoS_2$ the surface of which is a [100] plane having a size of 3×3, the $CoS_2$ having 4 layers in the thickness direction.

FIG. 2(a) is an unsubstituted $CoS_2$ surface model (schematic plan view) obtained by viewing the surface of the standard unit cell in FIG. 1(a) from above. The cobalt atom is represented by a black circle, and the sulfur atom is represented by a white circle in the same manner as in FIG. 1(a). FIG. 2(b) is a unit cell obtained by subjecting the standard unit cell in FIG. 1(a) to substitution, a surface model (schematic plan view) of substituted $CoS_2$ when a substitutional atom exists at the first layer, the surface model obtained by viewing a surface of a unit cell of $CoS_2$ having a cubic crystal structure from above, the $CoS_2$ having a proportion of a number of substitutional atoms of 12.5%, and a schematic diagram illustrating one example of a unit cell having a size of the surface of 2×2 when a substitutional atom (represented by large gray circle) exists at a surface (first layer) of $CoS_2$ having a cubic crystal structure. An atom S1 represented by a small gray circle is an S atom for which studies on eliminating are conducted.

FIG. 3 is a surface model (schematic plan view) of substituted $CoS_2$ when a substitutional atom exists at the second layer, the surface model obtained by viewing a surface of a unit cell of $CoS_2$ having a cubic crystal structure from above, the $CoS_2$ having a proportion of a number of substitutional atoms of 12.5%, and a schematic diagram illustrating one example of a unit cell having a size of the surface of 2×2 when a substitutional atom (represented by large gray circle) exists at the second layer from the surface of $CoS_2$ having a cubic crystal structure. Atoms S1 and S2 each represented by a small gray circle are S atoms for which studies on eliminating are conducted.

DESCRIPTION OF EMBODIMENTS

«Oxygen Reduction Catalyst»

An oxygen reduction catalyst according to one embodiment of the present invention (hereinafter, also referred to as "present catalyst") is an oxygen reduction catalyst containing substituted $CoS_2$, wherein the substituted $CoS_2$ has a cubic crystal structure; the oxygen reduction catalyst contains the substituted $CoS_2$ within 0.83 nm from the surface thereof; and the substituted $CoS_2$ has at least one substitutional atom selected from the group consisting of Cr, Mo, Mn, Tc, Re, Rh, Cu, and Ag in some of Co atom sites.

The present catalyst contains the substituted $CoS_2$ at the surface thereof, therefore exhibits excellent durability, particularly, excellent durability in, for example, a fuel cell environment and has stable oxygen reduction ability over a long period of time.

Therefore, the present catalyst is used suitably for an electrode, particularly, a cathode for a fuel cell.

The present inventors have conducted diligent studies to find that conventional $CoS_2$ has oxygen reduction ability but has low durability. The present inventors have considered that the main cause of the low durability is that S is eliminated from $CoS_2$. The present inventors have also considered that the durability of $CoS_2$ is improved when $CoS_2$ contains a heteroatom.

Thus, the present inventors have specifically found substitutional atoms each capable of improving the durability when some of Co atoms in $CoS_2$ are replaced by substitutional atoms based on a computational chemistry approach, which will be described below, actually ascertained that the durability of substituted $CoS_2$ containing the atoms has been improved, found that the calculation result and the durability of an oxygen reduction catalyst containing the substituted $CoS_2$, the oxygen reduction catalyst actually synthesized, have a high correlation, and thereby completed one embodiment of the present invention.

<Substituted $CoS_2$>

Substituted $CoS_2$ is a crystal which contains $CoS_2$ having a cubic crystal structure, exists within 0.83 nm from the surface of the present catalyst, and has a structure in which some of the Co atoms are replaced by at least one substitutional atom selected from the group consisting of Cr, Mo, Mn, Tc, Re, Rh, Cu, and Ag.

When such substituted $CoS_2$ exists at least at the surface of an oxygen reduction catalyst, the elimination of S is suppressed, and therefore the oxygen reduction catalyst exhibits excellent durability, particularly, excellent durability in, for example, a fuel cell environment and has stable oxygen reduction ability over a long period of time.

It has been found that the present catalyst has excellent oxygen reduction ability because the surface of the present catalyst is also the crystal surface of the substituted $CoS_2$, and the substituted $CoS_2$ has a cubic crystal structure. Accordingly, the substituted $CoS_2$ is characterized in that it has a cubic crystal structure.

Whether substituted $CoS_2$ is a cubic crystal or not can be checked by an XRD spectrum and/or transmission electron microscope observation, and, specifically, by the methods described in Examples, which will be described below.

The substitutional atom is Cr, Mo, Mn, Tc, Re, Rh, Cu, or Ag, and Re, Cr, Tc, Mo, and Cu are preferable, more preferably Re, Cr, Tc, and Mo, and particularly preferably Re and Cr from the viewpoints such as obtaining a catalyst having superior durability.

It is to be noted that the substituted $CoS_2$ may contain two or more atoms of these substitutional atoms.

An effect of improving the durability of the catalyst based on the substitutional atom has hardly been ascertained even if the substitutional atom exists at the fourth layer or after from the oxygen reduction catalyst surface (crystal surface is defined as first layer).

Accordingly, substituted $CoS_2$ is characterized in that it contains $CoS_2$ having a cubic crystal structure, and the substitutional atom exists within the third layer from the surface of the oxygen reduction catalyst, namely within 0.83 nm from the crystal surface constituting the surface of the oxygen reduction catalyst.

Whether some of the Co atoms within 0.83 nm from the surface of $CoS_2$ having a cubic crystal structure are replaced by the substitutional atom or not, namely whether the oxygen reduction catalyst contains the substituted $CoS_2$ within 0.83 nm from the surface of the oxygen reduction catalyst or not can be checked by performing TEM observation in a direction of cross section of powder particles of the present catalyst. The TEM has atomic resolution and can perform element mapping, and therefore the position of the substituted $CoS_2$ in the powder particles of the present catalyst, and the proportion of the number of substitutional atoms in the substituted $CoS_2$, which will be described later, can be checked.

It is to be noted that the substitutional atom needs to exist at the first layer to the third layer when the surface of the oxygen reduction catalyst is defined as the first layer from the viewpoint of improving the durability of the present catalyst, and therefore the substitutional atom may exist or may not exist at the fourth layer or after in the oxygen reduction catalyst.

The proportion of the number of the substitutional atoms in the substituted $CoS_2$ (hereinafter, also referred to "proportion of substitution"), calculated according to the following equation, is preferably 5 to 15%, more preferably 5 to 12.5%, and still more preferably 5 to 10% from the viewpoints such as enabling the catalyst having a cubic crystal structure and having excellent oxygen reduction ability and durability to be obtained easily.

Proportion of number of substitutional atoms [%]= [number of substitutional atoms]/[number of substitutional atoms+number of Co atoms]×100

When the substitutional atoms are assumed to exist equally in the crystals constituting the surface of the oxygen reduction catalyst, the atomic ratio at the outermost surface when the proportion of substitution is 5% is Co:substitutional atom=19:1, the calculation result indicates that S bonds mostly to Co. That is, it is considered that the fact that substituted $CoS_2$ has excellent durability even at a proportion of substitution of 5% directly means that the bond of S which does not bond to the substitutional atom, namely, a Co—S—Co bond, is strengthened by the existence of the substitutional atom.

A catalyst having a structure obtained by changing only the composition of elements at the surface of the catalyst is generally called a core-shell catalyst. When the present catalyst has this structure, the proportion of substitution of the substitutional atom in the whole catalyst can thereby be reduced, so that even an expensive atom can be effectively utilized.

<Method for Producing Oxygen Reduction Catalyst Containing Substituted $CoS_2$>

A method for producing the present catalyst is not particularly limited; however, a method including a step 1 of synthesizing a metal sulfide and a step 2 of subjecting the metal sulfide obtained in the step 1 to an annealing treatment is preferable from the viewpoints such as enabling the present catalyst having excellent durability to be produced more easily.

To make, as the present catalyst, a core-shell catalyst containing substituted $CoS_2$ only at the surface thereof, unsubstituted $CoS_2$ is prepared in advance, and the unsubstituted $CoS_2$ is charged together with the raw material component for use in the step 1, which will be described later, in the method for producing the present catalyst. Thereby, the unsubstituted $CoS_2$ can be made into a core, and the substituted $CoS_2$ can be laminated as a shell on the surface of the unsubstituted $CoS_2$. By adjusting the ratio of the amounts of the unsubstituted $CoS_2$ and the raw material component, the thickness of each layer of the substituted $CoS_2$ to be a shell in a resultant catalyst can be adjusted to arbitrary thickness for three or more layers.

(Step 1)

The step 1 is not particularly limited as long as the metal sulfide is obtained; however, a step of synthesizing the metal sulfide by using a raw material component containing a sulfur source, a cobalt compound, and a substitutional atom-containing compound and reacting this raw material component is preferable.

The cobalt compound is not particularly limited; however, a carbonyl compound of cobalt is preferably used from the viewpoints such as simplicity of the step 1. Specifically, preferred examples of the cobalt compounds to be used include octacarbonyldicobalt.

One, or two or more cobalt compounds may be used.

The substitutional atom-containing compound is not particularly limited; however, a substitutional atom-containing carbonyl compound is preferably used from the viewpoints such as simplicity of the step 1. Specifically, preferred examples of the substitutional atom-containing compound to be used include hexacarbonylchromium, and hexacarbonylmolybdenum.

One, or two or more substitutional atom-containing compounds may be used.

The amounts of the cobalt compound and the substitutional atom-containing compound to be used are such that the molar ratio of the substitutional atom to cobalt (moles of substitutional atom/moles of Co) is preferably 5 to 15 and more preferably 5 to 12.5.

The sulfur source is not particularly limited; however, a sulfur powder is preferable.

One, or two or more sulfur sources may be used.

The amount of the sulfur source to be used is such that the molar ratio of S to the total moles of cobalt and substitutional atom (moles of S/(moles of cobalt+substitutional atom)) is preferably 2 to 10 and more preferably 5 to 8.

When the molar ratio is smaller than 2, there is a tendency that a crystal having a composition of, for example, $Co_9S_8$, or CoS is liable to be obtained instead of cobalt disulfide in substituted $CoS_2$ and a catalyst having low oxygen reduction ability is liable to be obtained. When the molar ratio is larger than 10, there is a tendency that the unreacted sulfur source is liable to be left in substituted $CoS_2$ and a catalyst having low durability is liable to be obtained.

The reaction condition is not particularly limited; however, preferred examples of the reaction condition include a reaction condition in which reflux is performed for 8 to 30 hours in an atmosphere of an inert gas such as a nitrogen gas, using a solvent such as p-xylene. A resultant powder of the metal sulfide is preferably washed using a solvent, such as p-xylene, heated to less than the boiling point so as not to leave unreacted sulfur to remove the unreacted sulfur component sufficiently. The resultant powder of the metal sulfide contains substituted $CoS_2$ as a shell in a core-shell catalyst.

(Step 2)

The step 2 is not particularly limited as long as it is a step such that the present catalyst obtained by performing the annealing treatment contains, at the surface thereof, substituted $CoS_2$ having a cubic crystal structure.

The temperature during the annealing treatment is preferably 300 to 500° C. and more preferably 350 to 450° C.

from the viewpoints such as enabling the present catalyst having a desired structure to be obtained easily and enabling the present catalyst having excellent oxygen reduction ability to be obtained easily.

When the annealing treatment temperature is higher than 500° C., sulfur is liable to be eliminated and there is a possibility that cobalt disulfide ($CoS_2$) converts to polymorphous cobalt sulfide (CoS) including a hexagonal crystal, the polymorphous cobalt sulfide being inferior in oxygen reduction ability. In addition, there is a tendency that sintering and particle growth between particles of the resultant present catalyst occur to make the specific surface area of the present catalyst small, and therefore a catalyst having low oxygen reduction ability is obtained in some cases. On the other hand, when the temperature during the annealing treatment is lower than 300° C., there is a tendency that the present catalyst having sufficient crystallinity is not obtained, so that the present catalyst having high durability is not obtained in some cases.

The time for the annealing treatment is usually 1 to 8 hours and preferably 2 to 6 hours.

The atmosphere during the annealing treatment is preferably an inert atmosphere and is more preferably a nitrogen gas or argon gas atmosphere.

<Oxygen Reduction Catalyst>

The present catalyst is not particularly limited as long as it contains substituted $CoS_2$ at the surface thereof, and the present catalyst may substantially consist of substituted $CoS_2$ alone or may contain, for example, components which have conventionally been used as a catalyst for an electrode within a range where the effects of the present are not impaired; however, preferably, the present catalyst essentially consists of substituted $CoS_2$ alone.

One type of, or two or more types of substituted $CoS_2$ may be contained in the present catalyst.

The shape of the present catalyst is not particularly limited but is usually particle-like.

The specific surface area of the present catalyst is not particularly limited, but the BET specific surface area measured by a BET method is preferably 20 to 100 $m^2/g$ and more preferably 50 to 100 $m^2/g$ from the viewpoints such as being a catalyst having excellent oxygen reduction ability.

The present catalyst exhibits excellent durability, particularly, excellent durability in, for example, a fuel cell environment and has stable oxygen reduction ability over a long period of time.

Therefore, the present catalyst is used suitably in an electrode, a fuel cell in particular, and further, a cathode for a PEFC.

«Electrode»

An electrode according to one embodiment of the present invention has a catalyst layer containing the present catalyst. Therefore, the electrode has excellent durability and is extremely inexpensive when compared with the cases where platinum is used as a catalyst.

The catalyst layer is not particularly limited as long as it contains the present catalyst and may be the same as a conventionally known catalyst layer except that it contains the present catalyst.

The catalyst layer preferably contains the present catalyst and a polymer electrolyte and may further contain an electron-conductive particle in order to reduce electric resistance more.

The content of the present catalyst in the catalyst layer is preferably 30 to 100% by mass and more preferably 50 to 100% by mass from the viewpoints such as enabling the electrode having excellent oxygen reduction ability to be obtained easily.

Two or more present catalysts may be contained in the catalyst layer.

The polymer electrolyte is not particularly limited, and a polymer electrolyte which is generally used in a catalyst layer for use in, for example, a conventional electric cell can be used. Specific examples thereof include perfluorocarbon polymers (for example, NAFION (R)) having a sulfonate group, hydrocarbon polymer compounds having a sulfonate group, polymer compounds containing an inorganic acid such as phosphoric acid doped therein, organic/inorganic hybrid polymers part of which is substituted by a proton-conductive functional group, and proton-conductive bodies obtained by impregnating a polymer matrix with a phosphoric acid solution or a sulfonic acid solution. Among these, NAFION (R) is preferable.

Two or more polymer electrolytes may be contained in the catalyst layer.

Examples of the material for the electron-conductive particle include carbon, electrically conductive polymers, electrically conductive ceramics, metals, and electrically conductive inorganic oxides such as tungsten oxide and iridium oxide. The electron-conductive particle may be a particle containing two or more materials of these materials. Particularly, the electron-conductive particle made of carbon is preferable because: there is a tendency that the specific surface area is large; those having a small particle diameter are available easily and inexpensively; and the chemical resistance is excellent.

Two or more electron-conductive particles may be contained in the catalyst layer. In the case of one electron-conductive particle, a carbon particle is preferable, and in the case of two or more, a mixture of a carbon particle and another electron-conductive particle is preferable.

Examples of the carbon include carbon black, graphite, activated carbon, a carbon nanotube, a carbon nanofiber, a carbon nanohorn, porous body carbon, and graphene.

With respect to the particle diameter of the electron-conductive particle made of carbon, there is a tendency that when the particle diameter is too small, an electron-conductive path is hard to form, and when the particle diameter is too large, deterioration of gas diffusion properties in the catalyst layer and lowering of the utilization rate of the catalyst occur, and therefore the particle diameter is preferably 10 to 1000 nm and more preferably 10 to 100 nm.

When the carbon particle is used as the electron-conductive particle, the mass ratio of the present catalyst to the carbon particle (present catalyst:carbon particle) in the catalyst layer is preferably 1:1 to 100:1.

A method for forming the catalyst layer is not particularly limited, and examples thereof include a method in which a suspension obtained by dispersing the constituent materials of the catalyst layer in a solvent is applied on, for example, an electrolyte membrane, or a gas diffusion layer, which will be described later.

Examples of the application method include a dipping method, a screen printing method, a roll coating method, a spray method, and a bar coater application method. The method for forming the catalyst layer may also be a method in which the catalyst layer is formed on a support by an application method using the suspension obtained by dispersing the constituent materials of the catalyst layer in a solvent, and the catalyst layer is thereafter formed on, for example, an electrolyte membrane, or a gas diffusion layer by, for example, a transfer method.

The shape such as the thickness of the catalyst layer is not particularly limited and may be the same shape as that of a conventionally known catalyst layer.

The electrode may be a cathode or an anode; however, the electrode contains the present catalyst and therefore is preferably a cathode from the viewpoints such as exhibiting the effects of the electrode further.

«Membrane Electrode Assembly»

A membrane electrode assembly according to one embodiment of the present invention includes a cathode, a polymer electrolyte membrane, and an anode in this order, and the cathode is above described electrode.

The membrane electrode assembly may have a gas diffusion layer on a side opposite to the polymer electrolyte membrane side of the cathode and on a side opposite to the polymer electrolyte membrane side of the anode.

As the polymer electrolyte membrane, for example, a polymer electrolyte membrane containing a perfluorosulfonic acid polymer, or a polymer electrolyte membrane containing a hydrocarbon polymer is generally used; however, for example, a membrane obtained by impregnating a polymer microporous membrane with a liquid electrolyte, or a membrane obtained by filling a porous body with a polymer electrolyte may be used.

The gas diffusion layer is not particularly limited, a conventionally known layer can be used, and examples thereof include a layer which is porous and assists diffusion of a gas. The gas diffusion layer is preferably a layer having electron conductivity, having high gas diffusion properties, and having high corrosion resistance, and a carbon porous material such as carbon paper or carbon cloth is used.

The membrane electrode assembly can be obtained, for example, by disposing the cathode, the polymer electrolyte membrane, and the anode in this order, or, when the gas diffusion layers are used, by disposing the gas diffusion layer, the cathode, the polymer electrolyte membrane, the anode, and the gas diffusion layer in this order, and thereafter performing pressing. It is to be noted that heat may be applied in the pressing.

On this occasion, a laminated product obtained by forming the catalyst layer on the polymer electrolyte membrane and/or the gas diffusion layer may be used. When such a laminated product is used, pressing may be performed disposing the laminated product in such a way that the catalyst layer side of the laminated product faces the polymer electrolyte membrane side.

«Fuel Cell»

A fuel cell according to one embodiment of the present invention includes the membrane electrode assembly. The fuel cell is not particularly limited, and examples thereof include a molten-carbonate fuel cell (MCFC), a phosphoric acid fuel cell (PAFC), a solid oxide fuel cell (SOFC), and a PEFC.

Among them, as the fuel cell, a PEFC using, for example, hydrogen, or methanol as fuel is preferable from the viewpoints such as exhibiting the effects of the present invention further. The present catalyst has high durability in a PEFC operating environment, and therefore even when the fuel cell is a PEFC, the PEFC has high durability in an operating environment.

EXAMPLES

Hereinafter, the present invention will be described more specifically giving Examples of the present invention. It is to be noted that these Examples are exemplification for description, and the present invention is not limited by these Examples at all.

<Computational Chemistry Approach>

Substitutional atoms each capable of improving the durability of $CoS_2$ existing at least at the surface of an oxygen reduction catalyst were found by the following computational chemistry approach.

(Software for Molecular Simulation Analysis)

Quantum esprreso ver5.2, which is first-principles electronic state calculation software, was used for the calculation.

(Calculation Conditions)

Calculation was conducted based on DFT (Density Functional Theory) using GGA-PBE as exchange correlation functionals. Pseudopotential by a PAW (projector augmented wave) method was used as potential of each atom. Plane waves were used as basis functions, the energy cut-off was set to 966 eV, and sampling of K-points was conducted only at Γ-points.

(Unit Cell)

A surface model of the [100] plane of $CoS_2$ having a cubic crystal structure was used in unit cells of the present Example. When the proportion of substitution by a substitutional atom is 12.5%, a structure obtained by setting the size of the surface (upper face) to 2×2, setting six layers in the depth direction, and allowing only three layers from the surface to have degrees of freedom in structure optimization was used as a unit cell. In addition, when the proportion of substitution by a substitutional atom is 5.6%, a structure obtained by setting the size of the surface (upper face) to 3×3, setting four layers in the depth direction, and allowing only two layers from the surface to have degrees of freedom in structure optimization was used as a unit cell. A three-dimensional periodic boundary condition was imposed in the calculation.

In substitution of Co and elimination of S each conducted in Examples, either one of the unit cells was selected and utilized according to the proportion of substitution. The selected unit cell is also referred to as the "standard unit cell." Structure examples of respective standard unit cells for use when the proportion of substitution by a substitutional atom is 12.5% and is 5.6% are illustrated in FIGS. 1(a) and 1(b), respectively.

It is to be noted that, for example, when the proportion of substitution by a substitutional atom is smaller than 12.5%, a cell which is larger than the standard unit cell in the case of 12.5% may be used as a standard unit cell, and when the proportion of substitution by a substitutional atom is larger than 12.5%, a cell which is smaller than the standard unit cell in the case of 12.5% may be used as a standard unit cell.

<Calculation Method>

When ΔE>0 in the following equation (1), it can be said that substituted $CoS_2$ constituting the surface of the oxygen reduction catalyst has superior durability to unsubstituted $CoS_2$, and therefore substitutional atoms satisfying ΔE>0 were derived from calculation.

$$\Delta E = E \text{ (substituted)} - E \text{ (unsubstituted)} \quad (1)$$

[In the equation (1), the "E (substituted)" represents the elimination energy of S from substituted $CoS_2$, and the "E (unsubstituted)" represents the elimination energy of S from unsubstituted $CoS_2$.]

S which is easiest to eliminate in $CoS_2$ having a cubic crystal structure is S which exists at the surface of the $CoS_2$ having a cubic crystal structure, and therefore the "elimination energy of S existing at the surface in the crystal" was calculated as the "elimination energy of S" in the ΔE.

Next, the present inventors considered that the "ΔE" can be expressed by the following equation (2) based on the assumption that when Co in $CoS_2$ having a cubic crystal structure, the $CoS_2$ constituting the surface of the oxygen reduction catalyst, is replaced by a substitutional atom, the substitutional atoms exist equally at positions of Co constituting each layer of the cubic crystal structure.

$$\Delta E \approx W1+W2+W3+W4+\ldots \quad (2)$$

[In the equation (2), the "W1" represents a value obtained by subtracting the elimination energy of S from unsubstituted $CoS_2$ from the elimination energy of S when one substitutional atom exists at the surface (at the first layer) of $CoS_2$. W2 or after represents a value obtained by subtracting the elimination energy of S from unsubstituted $CoS_2$ from the elimination energy of S when one substitutional atom exists at the second layer or after from the surface of $CoS_2$, the value represented in the same manner as in W1 except that the layer number, which is counted from the surface, of a layer at which the substitutional atom exists is changed.]

It is to be noted that the W1 to W3 change depending on the positional relationship between the substitutional atom and S to be eliminated; however, the calculation intends to find a substitutional atom which makes it hardest to eliminate S, and therefore, among the elimination energy values which are different depending on the positional relationship between the substitutional atom and S to be eliminated, the smallest elimination energy value was used.

Specifically, the ΔE and W1 to W4 were calculated based on the following contents.

(Unsubstituted $CoS_2$ Surface Model and Surface Model after Eliminating S Therefrom)

The standard unit cell was subjected to structure optimization to calculate the energy after the structure optimization. The energy was denoted as E1. Next, structure optimization was conducted in a structure obtained by removing one atom of S at the outermost surface in the standard unit cell, and the resultant energy was denoted as E2.

(Surface Model of Substituted $CoS_2$ when Substitutional Atom Exists at the First Layer and Surface Model after Eliminating S Therefrom)

FIG. 2(a) illustrates a structure of the surface of the standard unit cell, the structure viewed from above. Structure optimization was conducted in a structure in which one substitutional atom exists only at the first layer in the standard unit cell, and the resultant energy was denoted as E3. In addition, structure optimization was conducted in a structure obtained by removing one atom of S (S1 in FIG. 2(b)) at the first layer, the S existing at a position where the influence of substitution is considered to be smallest in the substituted $CoS_2$, the position farthest from the substitutional atom, and the resultant energy was denoted as E4.

It is to be noted that FIG. 2(b) illustrates a structure example of substituted $CoS_2$ when a substitutional atom, Cu, exists at the first layer.

The W1 can be expressed by the following equation.

$$W1=(E4-E3)-(E2-E1)$$

When the value of W1 is positive, S is harder to eliminate than in the case of unsubstituted $CoS_2$ due to the substitutional atom at the first layer, meaning that the durability of substituted $CoS_2$ is improved. Conversely, when the value of W1 is negative, S is easier to eliminate, meaning that the durability is deteriorated.

(Surface Model of Substituted $CoS_2$ when Substitutional Atom Exists at the Second Layer and Surface Model after Eliminating S Therefrom)

Structure optimization was conducted in a structure in which one substitutional atom exists only at the second layer from the surface in the standard unit cell, and the resultant energy was denoted as E5. In addition, structure optimization was conducted in a structure obtained by removing one atom of S (S2 in FIG. 3) existing right above the substitutional atom and at the first layer in the substituted $CoS_2$, and the resultant energy was denoted as E6. Separately, structure optimization was conducted in a structure obtained by removing one atom of S (S1 in FIG. 3) at the first layer, the S existing at a position farthest from the substitutional atom in the substituted $CoS_2$, and the resultant energy was denoted as E7.

It is to be noted that FIG. 3 illustrates a structure example of substituted $CoS_2$ when a substitutional atom, Cu, exists at the second layer.

The W2 can be expressed by the following equation.

$$W2=(\text{Min}(E6,E7)-E5)-(E2-E1)$$

The Min (E6, E7) means that E6 and E7 are compared to select a value of the one having a lower numerical value. The same applies hereinafter.

(Surface Model of Substituted $CoS_2$ when Substitutional Atom Exists at the Third Layer and Surface Model after Eliminating S Therefrom)

Structure optimization was conducted in a structure in which one substitutional atom exists only at the third layer from the surface in the standard unit cell, and the resultant energy was denoted as E8. In addition, structure optimization was conducted in a structure obtained by removing one atom of S existing right above the substitutional atom and at the first layer in the substituted $CoS_2$, and the resultant energy was denoted as E9. Separately, structure optimization was conducted in a structure obtained by removing one atom of S at the first layer, the S existing at a position farthest from the substitutional atom in the substituted $CoS_2$, and the resultant energy was denoted as E10.

The W3 can be expressed by the following equation.

$$W3=(\text{Min}(E9,E10)-E8)-(E2-E1)$$

(Surface Model of Substituted $CoS_2$ when Substitutional Atom Exists at the Fourth Layer and Surface Model after Eliminating S Therefrom)

Structure optimization was conducted in a structure in which one substitutional atom exists only at the fourth layer from the surface in the standard unit cell, and the resultant energy was denoted as E11. In addition, structure optimization was conducted in a structure obtained by removing one atom of S existing right above the substitutional atom and at the first layer in the substituted $CoS_2$, and the resultant energy was denoted as E12. Separately, structure optimization was conducted in a structure obtained by removing one atom of S at the first layer, the S existing at a position farthest from the substitutional atom in the substituted $CoS_2$, and the resultant energy was denoted as E13.

The W4 can be expressed by the following equation.

$$W4=(\text{Min}(E12,E13)-E11)-(E2-E1)$$

(Influence of Position of Substitution by Substitutional Atom on ΔE)

The ΔE changes depending on the position where a substitutional atom exists, but it is practically impossible to calculate the energy taking all the existence positions into consideration, and therefore an influence of the position where a substitutional atom exists (place of layer where substitutional atom exists) on ΔE was studied.

Specifically, the W1 to W4 (eV) were calculated when the substitutional atom is Re, W, or Fe. The results are as shown in Table 1.

TABLE 1

| Type of substitutional atom | W1 | W2 | W3 | W4 |
|---|---|---|---|---|
| Re | 0.18 | 0.02 | −0.08 | 0.00 |
| W | 0.21 | −0.21 | −0.08 | 0.00 |
| Fe | 0.02 | −0.01 | −0.03 | 0.00 |

It was found from Table 1 that in any of the substitutional atoms, when the substitutional atom exists at the fourth layer or after from the $CoS_2$ surface, the change in $\Delta E$ based on the substitutional atom is such an extent that it is negligible because W4, among W1 to W4, is smaller than 0.00 eV. That is, it is considered that the substitutional atom, when not existing at the first layer to the third layer, does not have a sufficient influence on the durability of the present catalyst. It is considered that the substitutional atom in the fourth layer or after does not have an influence on $\Delta E$ in this way because $CoS_2$ is in a metal-like electronic state.

The distance between the fourth layer and the surface of the cubic crystal structure of substituted $CoS_2$, the surface constituting the surface of the oxygen reduction catalyst, is approximately 0.83 nm, and therefore it can be said that the durability of substituted $CoS_2$ contained in the oxygen reduction catalyst is improved when the substitutional atom exists within 0.83 nm from the surface of the oxygen reduction catalyst.

As a result of studying the influence of the position of substitution by the substitutional atom on $\Delta E$, the equation (2) can be expressed by the following equation (3).

It is to be noted that it has been ascertained that, with respect to an error caused by the approximation, only a small error of approximately less than an order of $10^{-2}$ [eV] occurs.

$$\Delta E \approx E1 + E2 + E3 \quad (3)$$

According to the equation (3), $\Delta E > 0$ when the substitutional atom is Re, and therefore it is considered that substituted $CoS_2$ having Re in some of Co sites has superior durability to unsubstituted $CoS_2$. On the other hand, $\Delta E < 0$ when the substitutional atom is W and is Fe, and therefore it is considered that an improvement in the durability of substituted $CoS_2$ having W or Fe in some of Co sites is not recognized when comparison is made with the durability of unsubstituted $CoS_2$.

$\Delta E$ was calculated based on the equation (3) when the proportion of substitution was assumed to be 12.5%, and substitutional atom was assumed to be each of Cr, Mo, Mn, Tc, Re, Rh, Cu, Ag, W, and Fe. The results are shown in Table 2.

TABLE 2

| Type of substitutional atom | $\Delta E$ [eV] |
|---|---|
| Cr | 0.12 |
| Mo | 0.08 |
| Mn | 0.02 |
| Tc | 0.08 |
| Re | 0.13 |
| Rh | 0.02 |
| Cu | 0.05 |
| Ag | 0.02 |
| W | −0.08 |
| Fe | −0.02 |

As can be seen from Table 2, the substitutional atoms each capable of improving the durability of substituted $CoS_2$ are Cr, Mo, Mn, Tc, Re, Rh, Cu, and Ag. In addition, it is considered that the durability of substituted $CoS_2$ is excellent in the order of Re>Cr>Tc, Mo>Cu>Rh, Mn, Ag.

<Experimental Chemistry Approach>

Next, oxygen reduction catalysts containing substituted $CoS_2$ synthesized by the following methods were used to evaluate the durability thereof (retention rate of electrode potential at 10 μA before and after acid immersion test).

(Oxygen Reduction Catalyst Containing Substituted $CoS_2$ Containing Cr)

To a four-necked flask, 0.654 g of a sulfur powder (manufactured by FUJIFILM Wako Pure Chemical Corporation) and 150 mL of p-xylene (manufactured by FUJIFILM Wako Pure Chemical Corporation) were weighed and added, and reflux was performed in a nitrogen gas atmosphere for 30 minutes. After a resultant mixture was cooled, 0.608 g of octacarbonyldicobalt (manufactured by FUJIFILM Wako Pure Chemical Corporation) and 0.12 g of hexacarbonylchromium (manufactured by FUJIFILM Wako Pure Chemical Corporation) were weighed and added to the flask after cooling. Reflux was performed again in a nitrogen gas atmosphere for 24 hours after the addition. After a resultant mixture was cooled, filtration and washing were performed using ethanol (manufactured by FUJIFILM Wako Pure Chemical Corporation), and a residue was dried in a vacuum dryer for 6 hours to obtain a powder.

Subsequently, the temperature of the obtained powder was increased from room temperature to 400° C. at a temperature increasing rate of 10° C./min in a stream of a nitrogen gas (gas flow rate of 100 mL/min) using a quartz tube furnace, and firing was performed at 400° C. for 2 hours to obtain an oxygen reduction catalyst containing substituted $CoS_2$ containing Cr.

The amount of metals, such as cobalt, contained in the catalyst was obtained by completely decomposing a sample by heating using nitric acid and hydrofluoric acid to prepare a solution adjusted to a constant volume and using an element analyzer VISTA-PRO (manufactured by SII). The proportion of substitution of Cr in substituted $CoS_2$ contained in the obtained oxygen reduction catalyst was 15%.

(Oxygen Reduction Catalyst Containing Substituted $CoS_2$ Containing Mo)

An oxygen reduction catalyst containing substituted $CoS_2$ containing Mo was obtained in the same manner as when substituted $CoS_2$ containing Cr was synthesized except that 0.12 g of hexacarbonylchromium was changed to 0.147 g of hexacarbonylmolybdenum.

The proportion of substitution of Mo in substituted $CoS_2$ contained in the obtained oxygen reduction catalyst was 15%.

(Oxygen Reduction Catalyst Containing Substituted $CoS_2$ Containing W)

An oxygen reduction catalyst containing substituted $CoS_2$ containing W was obtained in the same manner as when substituted $CoS_2$ containing Cr was synthesized except that 0.12 g of hexacarbonylchromium was changed to 0.188 g of hexacarbonyltungsten.

The proportion of substitution of W in substituted $CoS_2$ contained in the obtained oxygen reduction catalyst was 15%.

(Oxygen Reduction Catalyst Consisting of Unsubstituted $CoS_2$ Alone)

An oxygen reduction catalyst consisting of unsubstituted $CoS_2$ alone was obtained in the same manner as when substituted $CoS_2$ containing Cr was synthesized except that 0.715 g of octacarbonyldicobalt was used in place of 0.608 g of octacarbonyldicobalt and 0.12 g of hexacarbonylchromium.

[Powder X-Ray Diffraction Measurement]

Powder X-ray diffraction measurement was performed for the substituted $CoS_2$ and the unsubstituted $CoS_2$ based on the following conditions using Panalytical MPD manufactured by Spectris Co., Ltd. to ascertain that each of the substituted $CoS_2$ and the unsubstituted $CoS_2$ is $CoS_2$ having a cubic crystal structure, the $CoS_2$ listed in crystal information of reference code of 01-070-2865.

Characteristic X-ray: Cu-Kα line
Output: 45 kW, 180 mA
Measurement range (2θ): 10 to 90°
Measurement mode: FT
Reading width: 0.02°
Sampling time: 0.70 seconds
DS, SS, RS: 0.5°, 0.5°, 0.15 mm
Goniometer radius: 185 mm

[Check on Position where Substitutional Atom Exists and Proportion of Substitution]

Existence of substituted $CoS_2$ within 0.83 nm from the surface of each catalyst in the oxygen reduction catalysts containing substituted $CoS_2$ was checked using a transmission electron microscope (TEM).

Specifically, each of the oxygen reduction catalyst powders containing substituted $CoS_2$ was embedded in an epoxy resin and cured, and a cross section observation sample was then prepared by an ultramicrotome method. The cross section of the sample was observed with a field emission-transmission electron microscope (FE-TEM) (manufactured by JEOL Ltd., JEM-3100FEF), and an HAADF-STEM image of 15000000 magnifications by a high-angle annular dark field scanning transmission electron microscope method (HAADF-STEM) was taken to perform energy dispersive X-ray spectroscopy (EDS) mapping analysis. The position of the surface of the oxygen reduction catalyst of $CoS_2$ having a cubic crystal structure was ascertained from the position of the outermost cobalt atom in the HAADF-STEM image in which element mapping was reflected, and the existence of the substitutional atom within 0.83 nm from the surface in terms of the distance in the radial direction of particles was ascertained. For 10 oxygen reduction catalyst powder particles containing the substituted $CoS_2$, 6 arbitrary points on the circumference of the cross section of every particle were checked to find that in any of the observation points, the substitutional atom existed within 0.83 nm from the surface. The proportion (%) of substitution was calculated from the number of substitutional atoms whose existence was ascertained and the number of cobalt atoms according to the above-described method. The proportion of substitution was defined as the arithmetical mean of the proportions of substitution determined for respective checkpoints. With respect to the prepared oxidation reduction catalysts containing substituted $CoS_2$, the proportion of substitution was within a range of 5 to 15% in any of the catalyst particles.

[Durability (Retention Rate of Electrode Potential at 10 pA Before and After Acid Immersion Test) Test]

A solution containing the oxygen reduction catalyst containing substituted $CoS_2$ or the oxygen reduction catalyst consisting of $CoS_2$ alone (15 mg), 2-propanol (1.0 mL), ion-exchanged water (1.0 mL), and 62 µL of a 5% NAFION (R) aqueous solution (manufactured by FUJIFILM Wako Pure Chemical Corporation) was stirred and suspended by ultrasonic waves to be mixed. On a glassy carbon electrode (manufactured by TOKAI CARBON CO., LTD., diameter: 5.2 mm), 20 pL of this mixture was applied, and the applied mixture was dried at 70° C. for 1 hour to obtain a catalyst electrode for every oxygen reduction catalyst.

A current-potential curve of the prepared catalyst electrode was measured by performing a potential scan at 5 mV/sec in a 0.5 mol/dm³ sulfuric acid aqueous solution at 30° C. in an oxygen gas atmosphere and in a nitrogen gas atmosphere. On that occasion, a reversible hydrogen electrode in a sulfuric acid aqueous solution having the same concentration was used as a reference electrode.

The electrode potential at 10 µA was obtained from the current-potential curve obtained by subtracting a reduction current in the nitrogen gas atmosphere from a reduction current in the oxygen gas atmosphere.

The electrode after measuring the current-potential curve was immersed in a 0.5 mol/dm³ sulfuric acid aqueous solution at 80° C. for 8 hours. Thereafter, the electrode potential at 10 µA was measured in the same manner as described above. The retention rate of the electrode potential at 10 µA before and after immersing the electrode in the sulfuric acid aqueous solution at 80° C. for 8 hours (electrode potential at 10 µA using electrode after acid immersion×100/electrode potential at 10 µA using electrode before acid immersion) was calculated. The results are shown in Table 3 together with the values of electrode potential before and after acid immersion.

TABLE 3

| Type of substitutional atom | Electrode potential (V) before acid immersion | Electrode potential (V) after acid immersion | Potential retention rate (%) | ΔE [eV] |
|---|---|---|---|---|
| Cr | 0.62 | 0.42 | 68 | 0.12 |
| Mo | 0.59 | 0.38 | 64 | 0.08 |
| W | 0.63 | 0.31 | 48 | −0.08 |
| Unsubstituted $CoS_2$ | 0.65 | 0.32 | 48 | 0.00 |

It is found from Table 3 that the tendency in the potential retention rate when the oxygen reduction catalysts each containing substituted $CoS_2$ actually obtained were used and the tendency in ΔE calculated by the calculation agree with each other. That is, it can be said that the oxygen reduction catalyst containing substituted $CoS_2$ for which ΔE according to the equation (3) has a positive value has superior durability to the oxygen reduction catalyst consisting of unsubstituted $CoS_2$ alone and, further, that the oxygen reduction catalyst having superior durability can be obtained as the value of the ΔE is larger.

It is to be noted that, when the substitutional atom is Cr, and the proportion of substitution is set to 5.6% or 12.5%, ΔE according to the equation (3) is as shown in Table 4 below.

TABLE 4

| Proportion of substitution [%] | ΔE [eV] |
|---|---|
| 5.6 | 0.18 |
| 12.5 | 0.13 |

As can be seen from Table 4, ΔE was positive for both cases where the proportion of substitution was 5.6% and was 12.5%. Accordingly, when the proportion of substitution is at least in a range of 5.6% to 12.5%, the durability of the oxygen reduction catalyst containing substituted $CoS_2$ containing at least one atom selected from the group consisting of Cr, Mo, Mn, Tc, Re, Rh, Cu, and Ag is considered to be improved more than the oxygen reduction catalyst consisting of unsubstituted $CoS_2$ alone.

(Change in Proportion of Substitution)

Oxygen reduction catalysts each containing substituted $CoS_2$ were obtained in the same manner as in the method for synthesizing the oxygen reduction catalyst containing substituted $CoS_2$ containing Cr except that the raw materials described in Table 5 below were used in place of 0.608 g of octacarbonyldicobalt and 0.12 g of hexacarbonylchromium in the synthesis method, and the potential retention rate was calculated using the oxygen reduction catalysts each containing substituted $CoS_2$ in the same manner as described above. The results are shown in Table 5.

TABLE 5

| Test | Raw Materials | Amount used (g) | Proportion of substitution (%) | | | | Electrode potential before immersion (V) | Electrode potential after immersion (V) | Potential retention rate (%) |
|---|---|---|---|---|---|---|---|---|---|
| | | | Co | Cr | Mo | W | | | |
| A | Octacarbonyldicobalt | 0.679 | 95 | 5 | — | — | 0.62 | 0.40 | 64 |
| | Hexacarbonylchromium | 0.040 | | | | | | | |
| B | Octacarbonyldicobalt | 0.644 | 90 | 10 | — | — | 0.63 | 0.43 | 68 |
| | Hexacarbonylchromium | 0.080 | | | | | | | |
| C | Octacarbonyldicobalt | 0.679 | 95 | — | 5 | — | 0.60 | 0.38 | 64 |
| | Hexacarbonylmolybdenum | 0.049 | | | | | | | |
| D | Octacarbonyldicobalt | 0.644 | 90 | — | 10 | — | 0.61 | 0.37 | 61 |
| | Hexacarbonylmolybdenum | 0.098 | | | | | | | |
| E | Octacarbonyldicobalt | 0.067 | 95 | — | — | 5 | 0.62 | 0.29 | 47 |
| | Hexacarbonyltungsten | 0.063 | | | | | | | |
| F | Octacarbonyldicobalt | 0.644 | 90 | — | — | 10 | 0.62 | 0.30 | 49 |
| | Hexacarbonyltungsten | 0.125 | | | | | | | |

It was found that even when the proportion of substitution was changed, the oxygen reduction catalyst containing substituted $CoS_2$ containing a substitutional element having a positive value of ΔE according to the equation (3) has superior durability to the oxygen reduction catalyst consisting of unsubstituted $CoS_2$ alone.

REFERENCE SIGNS LIST

1: Unit cell
2: Co
3: S
4: Substitutional atom (Cu)
S1, S2: S to be eliminated.

The invention claimed is:

1. An oxygen reduction catalyst comprising substituted $CoS_2$, wherein
the substituted $CoS_2$ has a cubic crystal structure;
the oxygen reduction catalyst comprises the substituted $CoS_2$ within 0.83 nm from the surface thereof; and
the substituted $CoS_2$ has at least one substitutional atom selected from the group consisting of Cr, Mo, Mn, Tc, Re, Rh, Cu, and Ag in some of Co atom sites.

2. The oxygen reduction catalyst according to claim 1, wherein a proportion of a number of substitutional atoms in the substituted $CoS_2$, the proportion calculated by the following equation, is from 5 to 15%:

Proportion [%] of number of substitutional atoms=
[number of substitutional atoms]/[number of substitutional atoms+number of Co atoms]×100.

3. An electrode having a catalyst layer comprising the oxygen reduction catalyst according to claim 1.

4. A membrane electrode assembly comprising:
a cathode;
a polymer electrolyte membrane; and
an anode,
in this order, wherein the cathode is the electrode according to claim 3.

5. A fuel cell comprising the membrane electrode assembly according to claim 4.

* * * * *